Sept. 16, 1952  P. H. KNOWLTON, JR  2,610,823
TURBINE BUCKET DAMPING ARRANGEMENT
Filed Feb. 11, 1947
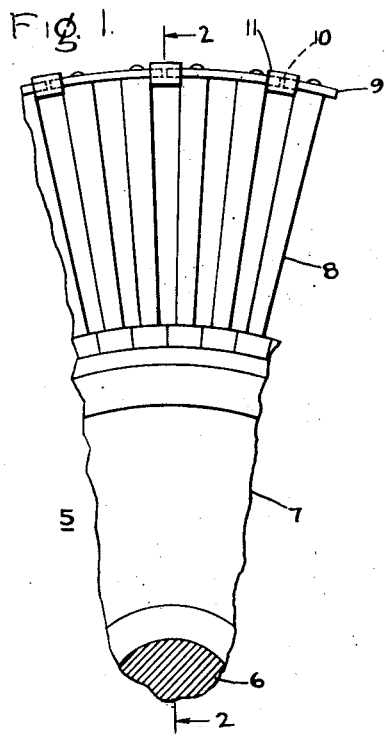
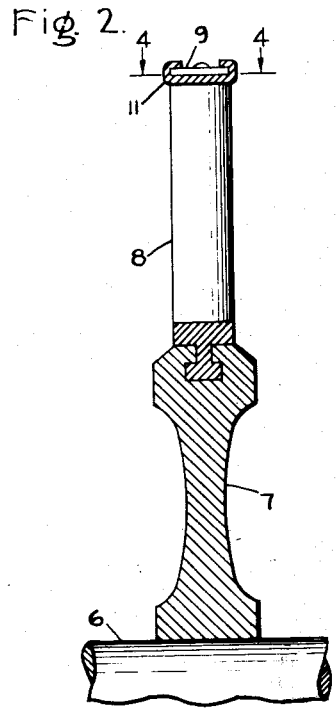
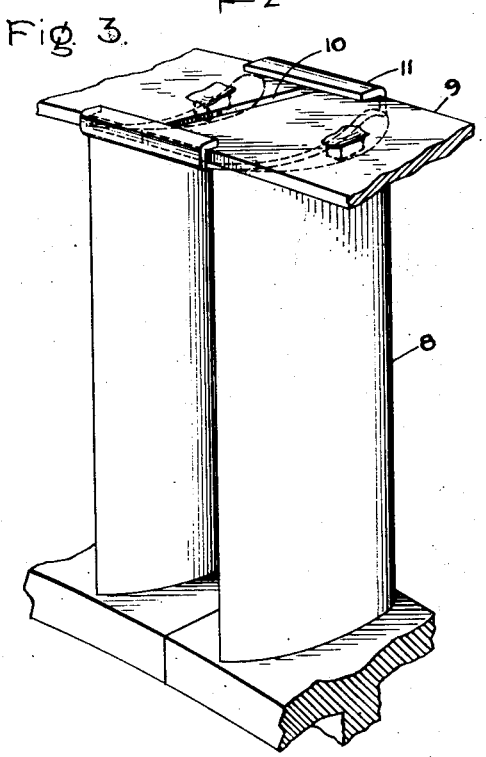
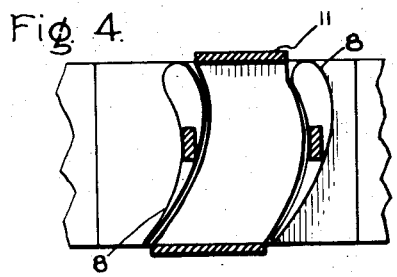
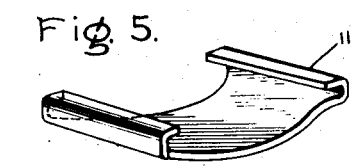
Inventor
Paul H. Knowlton Jr.,
by
His Attorney Patented Sept. 16, 1952

2,610,823

UNITED STATES PATENT OFFICE 2,610,823

TURBINE BUCKET DAMPING ARRANGEMENT

Paul H. Knowlton, Jr., Schenectady, N. Y., assignor to General Electric Company, a corporation of New York Application February 11, 1947, Serial No. 727,833

3 Claims. (Cl. 253—77)

The present invention relates to bucket wheels for axial flow elastic fluid turbines, and particularly to an improved means for damping vibration of the buckets.

It is well known that during the operation of a steam or gas turbine the buckets or blades are subject to both transverse and tangential oscillatory movement produced by the impulses imparted to the buckets by the discrete jets of operating medium from the nozzles, or by irregularities in groups of nozzles caused by imperfections in manufacture. These vibrations, if unchecked, may cause fatigue failures of the buckets. Heretofore several methods have been employed to reduce or dampen these oscillations. Generally these methods may be classified into two groups. The first group provides for wires, rods, or the like which extend in either circular or spiral direction through or along the edges of the buckets, and which may or may not be secured to the buckets. The second group provides for short rods or pins which extend axially through channels formed in the root and shroud portions of adjacent buckets. The wires, rods or the like of both of these groups offer frictional resistance to oscillatory movements of the bucket and thereby absorb or dampen bucket vibration energy. However, the initial cost of manufacturing and installation of any of the above methods may prove to be quite high.

By contrast, this invention provides for an effective bucket vibration damping means which is simple in construction so that manufacturing and installation costs are quite low.

Accordingly, an object of the invention is to provide an improved construction and arrangement for turbine bucket vibration damping means.

Another object is to provide an improved bucket vibration dampener which is economical to manufacture and install, and which may be added to existing bucket wheels where a bucket vibration damping means is found necessary after the turbine is built.

Other objects and advantages will be apparent from the following description taken in connection with the accompanying drawings in which Fig. 1 is a side view, in elevation, of a turbine rotor embodying my invention; Fig. 2 is a radial sectional view taken on the plane 2—2 of Fig. 1; Fig. 3 is a perspective view of a turbine wheel section employing my invention; Fig. 4 is a top view partly in section taken on the plane 4—4 of Fig. 2; and Fig. 5 is a perspective view of a vibration damper in accordance with my invention.

Referring to the drawings, the turbine rotor 5 comprises a shaft 6 with one or more bucket wheel discs 7 secured thereon. Secured to each disc 7 are a plurality of buckets 8, surrounded by a shroud band 9. It is preferable to form the shroud band 9 in segments, which may cover any desired number of buckets. Usually a segment of the band is secured to not less than four, nor more than 12 buckets; but, for purposes of illustration here, each segment is shown simply as secured to the tips of only two buckets. Between adjacent segments of the shroud band there is a small gap, which is indicated at 10 in Fig. 1.

The vibration dampener in accordance with this invention comprises a simple clip 11, which may be readily made of sheet metal and is inserted radially inward under two adjacent shroud segments, thereby bridging the gap 10. The clip is not pressed tightly against the band segments but fits loosely, and is held in place by bending the edge portions radially outward and around the outer surfaces of the segments as shown in Figs. 2 and 3.

During operation of the turbine, the clips 11 are held tightly against the radially inward surfaces of the shroud band segments by centrifugal force. Hence these segments can move relative to each other only by slipping against the clip. The frictional resistance thus offered by the clips to any motion by the shroud segments enables the clips to absorb energy which would otherwise be available for destructive vibration. Because the clips are positioned at the periphery of the buckets, the lever arm upon which the friction force acts is substantially equal to the length of the buckets; therefore the friction force required to dampen a given amount of bucket vibration will be less than that required with vibration damping means applied at some radially inner point on the buckets. Conversely, a given friction force applied at the bucket periphery will dampen a greater amount of bucket vibration than if the damping force were applied at some point radially inward of the periphery.

It will be observed that vibration damping clips in accordance with the invention can easily be applied to turbine bucket wheels of conventional design, even after the wheels are completely assembled. The invention thus provides a simple remedy for bucket vibration problems which arise after a turbine is built and placed in operation.

While a particular embodiment of the invention has been illustrated and described, it will be obvious to those familiar with the art that various changes and modifications may be made without departing from the invention; and it is intended to cover in the appended claims all such changes and modifications as come within the true spirit and scope of the invention.

What I claim as new and desire to secure by Letters Patent of the United States, is:

1. In a turbo-machine rotor having a circumferential row of radially extending blades, blade vibration damping means including a first member rigidly fixed to a first blade and projecting in a circumferential direction towards an adjacent blade, a second member rigidly fixed to said adjacent blade and extending circumferentially towards and in alignment with said first member, the adjacent ends of said members being separated by a clearance space whereby said members are free to vibrate in a tangential direction, and a friction member having no flexibility in a circumferential direction and loosely disposed between said adjacent blades and having a surface in loose frictional engagement with a radially inner surface of the first and second members, whereby during operation centrifugal force alone resiliently biases the friction member outwardly against said inner surfaces of the first and second members to produce friction work when the members vibrate in a tangential direction, tending to dampen such vibration.

2. In a turbo-machine rotor having a circumferential row of radially extending blades, each having a base portion fixed to the rotor, and a segmental bucket shroud ring comprised of separate portions each secured tightly to the tips of a group of adjacent blades with the ends of adjacent segments spaced circumferentially to define a clearance space whereby each segment is free to vibrate in a tangential direction relative to adjacent segments, the combination of vibration damping means comprising a sheet metal clip loosely disposed between each pair of adjacent shroud segments, each clip including a body portion having no flexibility in a circumferential direction and disposed between adjacent buckets radially inwardly of the shroud and loosely engaging a radially inner surface of the adjacent shroud end portions, whereby during operation said clips are resiliently biased outwardly by centrifugal force alone to produce vibration-damping friction work between the clips and the respective adjacent shroud segments when the segments vibrate in a tangential direction relative to each other.

3. Turbo-machine blade vibration damping means in accordance with claim 2 in which each clip is loosely secured in place by circumferentially extending edge retainer portions extending radially outward and back over the outer surfaces of the shroud segments.

PAUL H. KNOWLTON, Jr.

REFERENCES CITED

The following references are of record in the file of this patent:

UNITED STATES PATENTS

| Number | Name | Date |
|---|---|---|
| 777,432 | Richter | Dec. 13, 1904 |
| 835,471 | Rotter | Nov. 6, 1906 |
| 1,378,464 | Junggren | May 17, 1921 |

FOREIGN PATENTS

| Number | Country | Date |
|---|---|---|
| 563,458 | Germany | Nov. 5, 1932 |